United States Patent
Pierfelice et al.

(10) Patent No.: US 8,452,533 B2
(45) Date of Patent: May 28, 2013

(54) SYSTEM AND METHOD FOR EXTRACTING A DESTINATION FROM VOICE DATA ORIGINATING OVER A COMMUNICATION NETWORK

(75) Inventors: Jeffrey Edward Pierfelice, Canton, MI (US); Eric Randell Schmidt, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 335 days.

(21) Appl. No.: 12/876,420

(22) Filed: Sep. 7, 2010

(65) Prior Publication Data

US 2012/0059579 A1 Mar. 8, 2012

(51) Int. Cl.
*G01C 21/34* (2006.01)
*G01S 1/00* (2006.01)
*G06F 19/00* (2006.01)

(52) U.S. Cl.
USPC ........ 701/427; 701/451; 701/488; 455/412.1; 704/275

(58) Field of Classification Search
USPC ................. 701/427, 425, 443, 451, 487, 488; 455/412.1, 563; 379/88.1; 704/275, 231, 704/E15.04; 340/993, 991, 995.23
See application file for complete search history.

(56) References Cited

U.S. PATENT DOCUMENTS

| | | | |
|---|---|---|---|
| 6,175,803 B1 * | 1/2001 | Chowanic et al. | 701/533 |
| 6,317,684 B1 | 11/2001 | Roeseler et al. | |
| 6,385,535 B2 * | 5/2002 | Ohishi et al. | 701/427 |
| 6,980,905 B2 * | 12/2005 | Chen | 701/420 |
| 7,130,387 B2 * | 10/2006 | Maruyama | 379/88.01 |
| 7,646,296 B2 | 1/2010 | Ohki | |
| 7,831,431 B2 * | 11/2010 | Huang et al. | 704/270.1 |
| 7,912,632 B2 * | 3/2011 | Ohashi et al. | 701/424 |

(Continued)

FOREIGN PATENT DOCUMENTS

| | | |
|---|---|---|
| JP | 2006153755 A | 6/2006 |
| JP | 2007271901 A | 10/2007 |
| WO | 2008/126981 A2 | 10/2008 |
| WO | 2009/022446 A1 | 2/2009 |

OTHER PUBLICATIONS

Charles Joseph King, II, Final Office Action for copending U.S. Appl. No. 12/955,098, mailed Feb. 9, 2012.

(Continued)

*Primary Examiner* — Tan Q Nguyen
(74) *Attorney, Agent, or Firm* — Gifford, Krass, Sprinkle, Anderson & Citkowski, P.C.

(57) ABSTRACT

A navigation system for an automotive vehicle capable of communicating with a remote communication device includes a host communication device connected to the remote communication device over a communication network to transmit voice data. A hands free communication unit having a speaker and a microphone is configured to connect with the host communication device so as to communicate with the remote communication device through the speaker and microphone. The vehicle navigation system also includes a voice recognition engine in communication with the hands free communication unit through a voice data link. A route generation unit is connected to the hands free communication unit and the voice recognition engine. The hands free communication unit is capable of transmitting the voice data originating from the remote communication device to the voice recognition engine over the voice data link. The voice recognition engine processes the voice data to extract a destination which is transferred to the route generation unit to determine a navigation route.

5 Claims, 1 Drawing Sheet

U.S. PATENT DOCUMENTS

| | | | |
|---|---|---|---|
| 2003/0060976 A1* | 3/2003 | Sato et al. ..................... 701/209 |
| 2006/0129311 A1 | 6/2006 | Bauman et al. |
| 2007/0219718 A1 | 9/2007 | Pennock et al. |
| 2008/0004790 A1 | 1/2008 | Ames |
| 2008/0249711 A1* | 10/2008 | Matsuda ....................... 701/209 |
| 2010/0330975 A1* | 12/2010 | Basir ............................ 455/418 |
| 2012/0010805 A1 | 1/2012 | Wilkerson |
| 2012/0135714 A1 | 5/2012 | King, II |

OTHER PUBLICATIONS

Charles Joseph King, II, Non-final Office Action for copending U.S. Appl. No. 12/955,098, mailed Nov. 8, 2011.

Charles Joseph King, II, Amendment in Response to Non-Final Office Action Under 37 CFR §1.111, for copending U.S. Appl. No. 12/955,098, filed with the USPTO Jan. 18, 2012.

\* cited by examiner

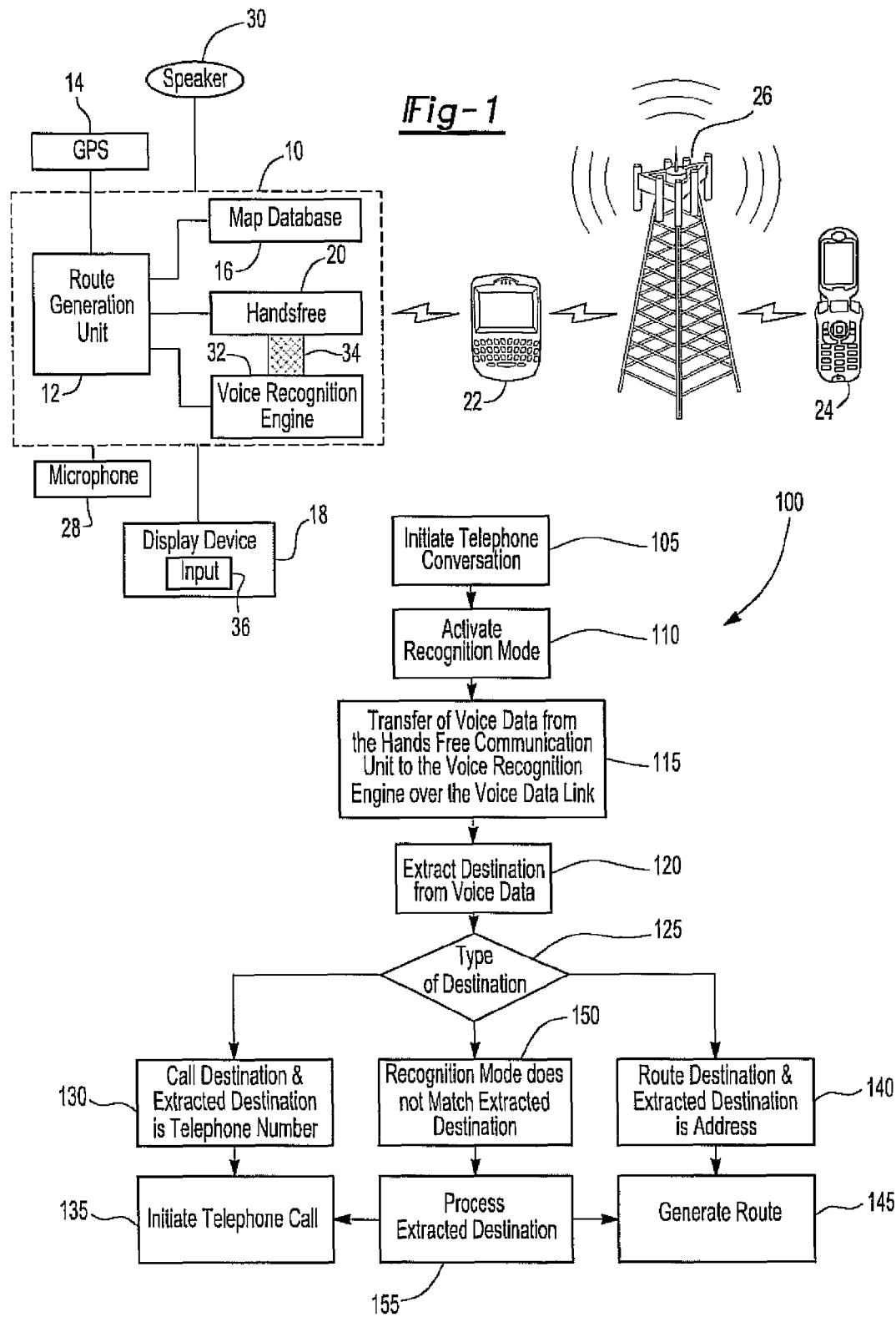

SYSTEM AND METHOD FOR EXTRACTING A DESTINATION FROM VOICE DATA ORIGINATING OVER A COMMUNICATION NETWORK

FIELD OF THE INVENTION

The present invention relates to a navigation system and, more particularly, to a vehicle navigation system that can extract a destination from voice data originating remote from the vehicle.

BACKGROUND OF THE INVENTION

In the interests of safety many modern automotive vehicles include hands free communication units allowing an occupant of the vehicle to place and receive cellular telephone calls without having to take a hand off the steering wheel. The hands free communication unit includes microphones or microphone arrays placed within the passenger compartment of the vehicle to receive the audio signals from the occupant. In addition, the hands free communication unit is often connected to the vehicle's audio speaker system allowing the occupant to listen to the person on the other side of the telephone call through the vehicle speakers.

The hands free communication unit is either wired or wirelessly connected to the occupant's cellular telephone such that the occupant can participate in the telephone conversation through the microphone and audio speakers.

Further, as voice recognition technology has advanced, many hands free communication units utilize a voice recognition engine to allow an occupant to control the cellular telephone through vocal commands. The voice recognition engine allows the occupant to initiate telephone calls, dial telephone numbers, and answer incoming calls. The voice recognition engine is often coupled with a navigation system integrated into the vehicle, thereby allowing an occupant to input a route destination through vocal commands. The integration of the voice recognition engine and the navigation system is an important safety feature as the vehicle occupant is now able to input a destination into the navigation system without diverting attention from the road while manually inputting the destination information into the navigation system.

However, the safety benefits of this system are only available when the driver is aware of the actual destination. Oftentimes, a driver may be already driving when the driver is notified of the exact destination address. This often occurs during a telephone call where the person on the other side of the telephone conversation informs the driver of the destination address. The driver is then required to attempt to memorize the destination address or write the address down prior to inputting it into the navigation system. In both instances the driver's attention is severely distracted in either memorizing or writing the destination address.

Previously known systems such as U.S. Patent Application Publication No. 2008/0036586 filed Jun. 5, 2007, discloses a system and method for receiving navigational data via a wireless messaging service such as a short message service ("SMS"). In this system, the navigation system connects to the driver's cellular telephone and searches through the received messages to determine if a message contains a navigation destination such as an address, a telephone number, or an email address. However, this system is limited in that the driver must receive the address through the wireless messaging system. As such, in order to obtain a destination, a driver participating in a telephone conversation is required to request the party on the other side of the conversation to send a message containing the address. This is particularly problematic when attempting to obtain the address of a commercial establishment in that the party on the other side of the conversation is required to take the driver's telephone number or email address and input the destination address into a wireless message.

Thus there exists a need for an improved navigational system capable of extracting a destination from voice data uttered by the party of the telephone conversation located remote from the vehicle.

SUMMARY OF THE INVENTION

The present invention provides a navigation system which overcomes the above-mentioned disadvantages of the previously known navigation systems.

In brief a navigation system for an automotive vehicle in which a communication device located remotely from the vehicle is in communication with a host communication device. The remote communication device and the host communication device connect over a communication network to transmit voice data. A hands free communication unit is configured to connect with the host communication device so as to communicate with the remote communication device. The vehicle navigation system also includes a voice recognition engine in communication with the hands free communication unit through a voice data link. A route generation unit is connected to the hands free communication unit and the voice recognition engine. The hands free communication unit is capable of transmitting the voice data originating from the remote communication device to the voice recognition engine over the voice data link. The voice recognition engine processes the voice data to extract a destination which is used as a route destination to determine a navigation route or a call destination which is used by the hands free communication unit to initiate a telephone call.

BRIEF DESCRIPTION OF THE DRAWINGS

Advantages of the present invention will be readily appreciated as the same becomes better understood by reference to the following detailed description when read in conjunction with the accompanying drawings, wherein like reference characters refer to like parts throughout the several views and in which:

FIG. 1 is a schematic illustrating the navigation system of the present invention; and FIG. 2 is a flowchart illustrating the method of extracting a navigation destination according to the present invention.

DETAILED DESCRIPTION OF THE INVENTION

The present invention has utility as a navigation system for use in an automotive vehicle which overcomes the above-mentioned disadvantages. The inventive navigation system allows an occupant of a vehicle who is in communication with a second party over a communication network to allow the second party to vocally input either a route destination or a call destination in various forms of input. This is particularly advantageous as the driver is no longer required to divert attention from the road when inputting a destination which is unknown to the driver.

Referring to FIG. 1, the inventive navigation system is generally indicated at 10. The navigation system includes a route generation unit 12, a GPS receiver 14, and a map database 16. Both the GPS receiver 14 and the map database 16 are in communication with the route generation unit 12. The GPS receiver 14 receives various types of signals originating from a plurality of GPS satellites orbiting the Earth. The GPS receiver 14 utilizes the received signals in order to determine the current location of the vehicle. The map database 16 includes various map information specifying the intersections of the road configurations utilizing links, nodes, and the like. The map information further includes address information, names of facilities, and phone numbers linked to specific addresses so as to use as a destination. The map database 16 may be recorded on a hard disk drive, a DVD, or a compact disc allowing map information to be updated on a regular basis by the insertion of a new DVD or compact disc. Upon receipt of a route destination, the route generation unit 12 communicates with the GPS receiver 14 to determine the vehicle's current location and accesses the map database 16 in order to obtain map information for both the current location and the route destination. The route generation unit 12 then generates a navigational route from the current location of the vehicle to the inputted route destination.

The navigation system 10 further includes a display device 18 acting as an input/output interface between the occupant and the vehicle navigation system 10. The display device 18 optionally includes a touch panel display configured to display various data and allow the occupant to enter data, such as either a route destination or a call destination.

The navigation system further includes, a hands free communication unit 20 connected to a host communication device 22 in either a wired or wireless manner. The host communication device 22 is illustratively the driver or passenger's cellular telephone which connects a second party to the conversation via a remote communication device 24 over a communication network 26, such as a cellular network. The hands free communication unit 20 communicates with the host communication device 22 through the use of a Bluetooth communication link, although other communication methods and protocols are within the scope of the invention.

It is appreciated, that the host communication device 22 is optionally, a computer and that the communication network 26 is the internet thereby incorporating internet established communications. The remote communication device 24 is either a telephone device including a cellular telephone, a land line telephone, or a computer connected to the communication network 26, which is disposed remote from the vehicle and consequently the host communication device 22.

The hands free communication device 20 connects the host communication device 22 with a microphone 28 and a speaker 30 disposed within the passenger compartment of the automotive vehicle. The hands free communication unit 20 allows the occupant to participate in a cellular phone conversation with the second party through the microphone 28 which picks up the voice uttered by the occupant of the vehicle, and the speaker 30 which outputs the voice uttered by the second party to the telephone conversation. It should be appreciated that the speaker 30 is optionally the audio system speakers of the automotive vehicle allowing the occupant to hear the second party to the cellular conversation through the audio system speakers.

The navigation system 10 further includes a voice recognition engine 32. The voice recognition engine and the hands free communication unit 20 are connected through a voice data link 34 allowing the voice recognition engine 32 to receive voice data uttered by the second party to the telephone conversation who is located remote from the vehicle. The voice data link 34 allows the voice recognition engine 32 to process the voice data without the reduction in quality associated with the voice data uttered by the second party to the telephone conversation being outputted from the host communication device 22 and picked up by microphone 28 and then transmitted to the voice recognition engine 32. It is appreciated, of course, that the voice data link 34 is a wired connected between the voice recognition engine 32 and the hands free communication unit 20.

In the alternative, the voice data link 34 is a wireless connection through the use of a Bluetooth communication link, although other communication methods and protocols are within the scope of the invention. In this manner, the voice recognition engine 32 is optionally disposed on a server remote from the vehicle with the voice data link 34 transmitting the voice data through a data communication module. The voice data is first transmitted over the voice data link 34 to the remote server where the voice recognition engine 32 processes the voice data to extract a destination. The extracted destination is then transmitted from the voice recognition engine 32 on the remote server to the navigation system 10 via the data communication module. It is appreciated, of course, that the data communication module illustratively includes a communication device such as a cellular telephone or a computer utilizing a cellular or interne communication network 26.

The voice recognition engine 32 utilizes any known voice/speech recognition software capable of converting spoken words into text from which a destination can be extracted. In the alternative, the voice recognition engine 32 phonetically compares the voice data to a list of destination entries to extract the destination. The destination entries are optionally stored on the route generation unit 12 which is accessed by the voice recognition engine 32.

The extracted destination is in the form of either a route destination or a call destination. The route destination is the desired end point of the navigational route and the call destination is the telephone number in which the occupant of the vehicle intends to call. It is appreciated that the route destination and the call destination can be determined through various inputs illustratively including, an address, longitude and latitude coordinates, telephone number associated with a specific address, a business or facility name, or the closest type of business ("nearest gas station"), a specific person's name, or address associated with a specific telephone number.

In order for the voice recognition engine 32 to extract a destination from voice data uttered by the second party to the conversation, a voice recognition mode is activated which alerts the voice recognition engine 32 to process the voice data transmitted over the voice data link 34. In the alternative, the initiation of the recognition mode operatively activates the voice data link 34 thereby transmitting voice data originating from the second party to the voice recognition engine 32. The recognition mode is activated through actuation of an input button 36 located on the display device 18 or through recognition of unique phrases having specific key words such as "activate recognition mode," "extract destination," or "inputting destination."

In addition, the activation of the recognition mode further includes the type of destination (geographic or telephone) such as "inputting route destination" or "inputting call destination." The distinction between the route destination and the call destination is important as a user may be inputting a telephone number of a business to generate navigational route from the current location to the address of the business associated with the telephone number, or the user may be inputting a specific business or person's name in order to have the hands free communication unit call the telephone number associated with the business or person. As the map database 16 includes associated addresses, telephone numbers, and associated names of business or persons, the navigation system 10 is capable of determining an address or telephone number through various inputs as stated above.

The input button 36 is also capable of distinguishing between a route destination or a call destination thereby allowing the route generation unit 12 to access the map database 16 to determine the required destination depending upon the input.

In order to facilitate a better understanding of the present invention, the method of extracting a destination from voice data uttered by the second party via the remote communication device 24 remote from the vehicle, will now be discussed in reference to FIG. 2. In step 105, a telephone conversation is initiated between the host communication device 22 and the remote communication device 24. The telephone call is initiated either through the occupant of the vehicle calling a remote party or the occupant answering a telephone call from the remote party. The hands free communication unit 20 allows the driver to dial or answer the call through voice input, and once the phone call is initiated the occupant conducts the phone call through the speakers 30 and the microphone 28. It is appreciated, of course, that the telephone conversation can be initiated without connection to the hands free communication unit 20, which is later connected in order to extract the destination.

The method advances to step 110 wherein the recognition mode is activated. During a conversation if the driver requires navigational assistance to a geographic location or a telephone number, the driver can activate the recognition mode specifying either route destination or call destination through audio input received through the microphone 28 and transferred to the voice recognition engine 32 or through actuation of the input button 36 on the display device 18. Upon activation of the recognition mode, the hands free communication unit 20 issues a confirmation signal identifying the start of the recognition mode. The confirmation signal is a simple audio beep or a prerecorded message stating "Please enter destination information after the beep." The hands free communication unit 20 transmits the confirmation signal through the communication network 26 to prompt the second party to begin inputting (i.e. speaking) the destination. The destination is transmitted from the remote communication device 24 through the communication network 26 to the host communication device 22 and the hands free communication unit.

The methodology advances to step 115 in which the hands free communication unit 20, in the recognition mode transmits the voice data utter by the second party to the voice recognition engine 32 over the voice data link 34. It is appreciated, of course, that the activation of the recognition mode in step 110 initiates the voice data link 34 thereby transferring voice data uttered by the second party to the telephone conversation to the voice recognition engine 32.

In step 120 the voice data is processed by the voice recognition engine to extract a destination. The voice recognition engine 32 converts the audio data into text utilizing any known voice/speech recognition software. Once the voice data has been converted into text, the method advances to decision box 125 wherein the voice recognition engine 32 determines whether the destination was inputted as a route destination or a call destination and whether the extracted destination is in the form of a route destination or a call destination. Specifically, if the recognition mode was activated as call destination and the extracted destination is a telephone number the method proceeds to step 130. The method then advances to step 135 where the call destination is transmitted to the hands free communication unit 20 to initiate a telephone call.

If the recognition mode was activated as a route destination and the extracted destination is in the form of an address or other geographical input, the method proceeds to step 140. The method then advances to step 145 in which the voice recognition engine 32 transmits the extracted route destination to the route generation unit 12 in order to generate navigational assistance from the current location of the vehicle to the route destination using the map database 16.

If the extracted destination does not match the recognition mode as activated (i.e. recognition mode activated as a route destination and extracted destination is a telephone number or recognition mode activated as a call destination and extracted destination is an address), the method proceeds to step 150. From step 150, the method advances to step 155 in which the voice recognition engine 32 transmits the extracted destination and the recognition mode (route destination or call destination) to the route generation unit 12 which processes the extracted destination using the map database 16 to match the recognition mode type with information associated with the extracted destination (i.e. a telephone number associated with an address, a business or person's name, or an address associated with a telephone number). Once the route generation unit 12 matches the extracted destination with a corresponding recognition type, the method advances to step 135 for call destinations or to step 145 for route destinations.

It is appreciated, of course, that the extracted destination is used to control a peripherals such as the hands free communication unit 20, the route generation unit 12, or other vehicle systems illustratively including an audio system, a diagnostic system, an adaptive cruise control system, a collision warning system, a power management system, an environmental control system, or any other vehicle system capable of being controlled by voice input.

The invention has been described in an illustrative manner. It is therefore to be understood that the terminology used is intended to be in the nature of words of description rather than of limitation. Many modifications and variations of the invention are possible in light of the above teachings. Thus within the scope of the appended claims the invention may be practiced other than as specifically described.

It is claimed:

1. A vehicle system in which voice data from a remote communication device disposed outside of the vehicle is transmitted to a host communication device, said vehicle system comprising:

a hands free communication unit configured to connect the host communication device so as to communicate with the remote communication device;

a route generation unit;

a voice recognition engine connected to said hands free communication unit through a voice data link;

a database having a plurality of destination names stored therein, each of said plurality of destination names having a telephone number and an address associated therewith; and an input unit which receives an input to select a recognition mode, said recognition mode is one of a route recognition mode or a call recognition mode, and upon selection of one of said route recognition mode or said call recognition mode said hands free communication unit transmits an audio prompt to the remote communication device to signify the start of voice recognition;

said hands free communication unit transmits said voice data originating from said remote communication device to said voice recognition engine over said voice data link, and wherein said voice recognition engine processes said voice data to extract a destination, said route generation unit compares said extracted destination to said selected recognition mode to determine whether said selected recognition mode matches said extracted destination;

said voice recognition engine transmits said extracted destination to said hands free communication unit if said extracted destination is a call destination and said selected recognition mode is said call recognition mode to initiate a telephone call using said extracted destination;

said voice recognition engine transmits said extracted destination to said route generation unit if said extracted destination is a route destination and said selected recognition mode is said route recognition mode to initiate navigational assistance using said extracted destination;

said route generation unit associates said extracted destination with one of said addresses stored in said database to determine a route destination used by said route generation unit and said database to initiate navigational assistance using said route destination when said extracted destination does not match said selected recognition mode and when said recognition mode is said route recognition mode;

said route generation unit associates said extracted destination with one of said one of said telephone numbers stored in said database to determine a call destination used by said hands free communication unit to initiate a telephone call using said call destination when said extracted destination does not match said selected recognition mode and when said recognition mode is said call recognition mode.

2. The vehicle system of claim 1, wherein said recognition mode is selected by input from an occupant of the vehicle.

3. The vehicle system of claim 2, wherein said hand free communication unit includes a microphone, and wherein said input is voice data received by said microphone.

4. The vehicle system of claim 2, wherein said input is actuation of a button connected to said vehicle system.

5. A method of extracting a destination from voice data transmitted by a remote communication device disposed remote from an automotive vehicle to a host communication device disposed within the automotive vehicle, said method comprising the steps of:

providing a hands free communication unit having a speaker and a microphone, said hands free communication unit configured to connect the host communication device with said speaker and said microphone so as to communicate with the remote communication device;

providing a route generation unit;

providing a voice recognition engine connected to said hands free communication unit through a voice data link;

providing a database having a plurality of destination names stored therein, each of said plurality of destination names having a telephone number and an address associated therewith;

selecting a recognition mode, said recognition mode is one of a route recognition mode or a call recognition mode;

transmitting an audio prompt to the remote communication device to signify the start of voice recognition upon selection of said recognition mode;

transmitting the voice data originating from said remote communication device to said voice recognition engine over said voice data link;

processing the voice data by said voice recognition engine, and wherein said voice recognition engine to extract a destination;

comparing said extracted destination to said selected recognition mode to determine whether said selected recognition mode matches said extracted destination;

transmitting said extracted destination to said hands free communication unit if said extracted destination is a call destination and said selected recognition mode is said call recognition mode to initiate a telephone call using said extracted destination;

transmitting said extracted destination to said route generation unit if said extracted destination is a route destination and said selected recognition mode is said route recognition mode to initiate navigational assistance using said extracted destination;

associating said extracted destination with one of said addresses stored in said database to determine a route destination used by said route generation unit and said database to initiate navigational assistance using said route destination when said extracted destination does not match said selected recognition mode and when said recognition mode is said route recognition mode; and associating said extracted destination with one of said telephone numbers stored in said database to determine a call destination used by said hands free communication unit to initiate a telephone call using said call destination when said extracted destination does not match said selected recognition mode and when said recognition mode is said call recognition mode.

\* \* \* \* \*